United States Patent [19]

Aoki et al.

[11] Patent Number: 5,138,574
[45] Date of Patent: Aug. 11, 1992

[54] METHOD AND DEVICE FOR OBTAINING SUM OF PRODUCTS USING INTEGRATED CIRCUIT

[75] Inventors: Takashi Aoki, Kawasaki; Yasushi Inamoto, Tokyo, both of Japan

[73] Assignee: Fujitsu Limited, Kawasaki, Japan

[21] Appl. No.: 746,816

[22] Filed: Aug. 15, 1991

Related U.S. Application Data

[63] Continuation of Ser. No. 483,985, Feb. 21, 1990, abandoned, which is a continuation of Ser. No. 97,747, Sep. 17, 1987, abandoned.

[30] Foreign Application Priority Data

Sep. 17, 1986 [JP] Japan .................. 61-218304

[51] Int. Cl.$^5$ .................................. G06F 7/52
[52] U.S. Cl. .................................. 364/754
[58] Field of Search .............. 364/736, 754, 757–759

[56] References Cited

U.S. PATENT DOCUMENTS

| | | | |
|---|---|---|---|
| 3,814,924 | 6/1974 | Tate | 364/757 |
| 4,594,680 | 6/1986 | Schomburg et al. | 364/765 |
| 4,679,164 | 7/1987 | Rearick | 364/728 |
| 4,706,211 | 11/1987 | Yamazaki et al. | 364/760 |

FOREIGN PATENT DOCUMENTS 57-199044 12/1982 Japan .
61-220028 9/1986 Japan .

OTHER PUBLICATIONS

Swartzlander, Jr. et al., *Inner Product Computers* IEEE Trans. on Computers, vol. C-27, No. 1, Jan. 1978, pp. 21-31.

*Primary Examiner*—Tan V. Mai
*Attorney, Agent, or Firm*—Staas & Halsey

[57] ABSTRACT

A method and a device for obtaining a sum of products which are applied to a spatial filter in a picture processing system, a transversal equalizer in radio communication equipment or the like, are based on the division of a portion of or entire operand by a predetermined figure length. The sum of products is first calculated among the operands having the same figure position, and the obtained results are added while shifting the figure in response to the divided figure length and the figure position. The lower figures, which do not need to be added, are then appended under the lowest figure of the addition result as is. Thus, the scale of the figure processed in an integrated circuit (IC) is decreased and the application of an IC of identical rating is further promoted.

11 Claims, 10 Drawing Sheets

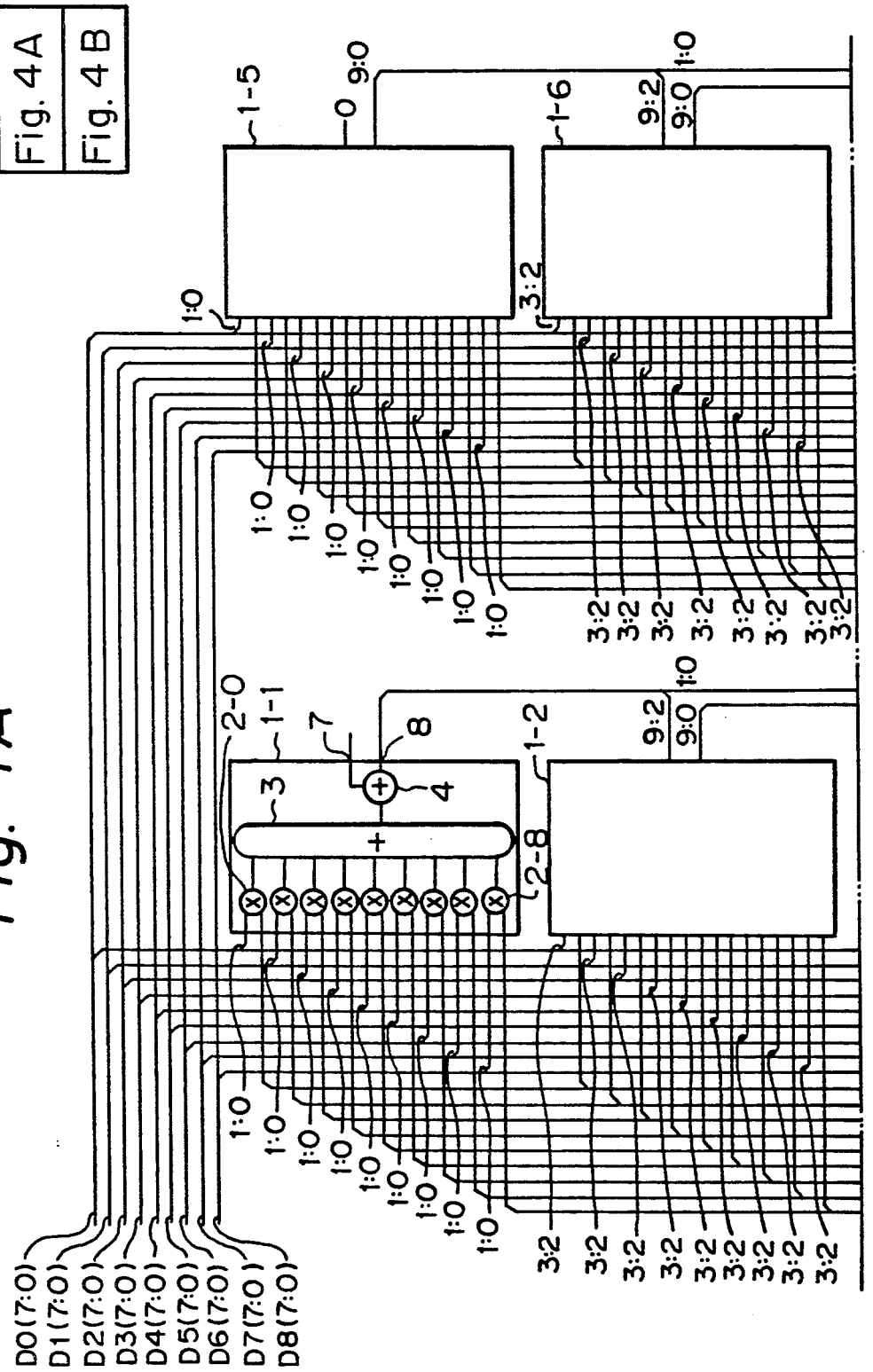

METHOD AND DEVICE FOR OBTAINING SUM OF PRODUCTS USING INTEGRATED CIRCUIT

This application is a continuation of application No. 07/483,985 filed Feb. 21, 1990, now abandoned, which is a continuation of Ser. No. 07/097,747 filed on Sep. 17, 1987, now abandoned.

BACKGROUND OF THE INVENTION

1) Field of the Invention

The present invention relates to a method and a device for obtaining a sum of products using integrated circuits (IC's) and utilized in a picture (or image) processing system using a spatial filtering method, and in particular, to a method and a device for obtaining a sum of products using a predetermined number of multipliers and adders for summing the products.

2) Description of the Related Art

A device for obtaining a sum of products is used in a picture processing system or in radio communication equipment. In the former, each pixel of a picture is processed by the device. A result, a smoother, enhanced, or contour-emphatic picture is obtained. The device is applied in the processing of a picture from a weather satellite, a parts inspection apparatus in a factory, a viewing robot, or the like. In the latter, the device is used as an element in a transversal equalizer, to increase the quality of the transmission signal.

A sum of products is obtained by calculating the products of pairs of multiplicands and multipliers, and then adding the total products. When this calculation is performed by IC's, usually the number of devices used is in accordance with the scale of the operation. Namely, first a desired number of multipliers (number of pairs of the object to be multiplied) is provided. The products of these pairs are calculated by the multiplier and a plurality of products is obtained. The products are added two by two and a corresponding sum is obtained for each addition. Each sum is then further added two by two, and this calculation operation is repeated until the total sum of products is obtained.

When the above operation is performed, the only problem with the multipliers is the capacity of an IC to cope with the number of multipliers and the figure length of the operand applied to the multiplier. The "figure length", i.e., number of numeric characters, handled by this multiplier is determined by the figure length of the multiplicand and multiplier. On the other hand, for the adders, the sums to be calculated increase as the processing advances. This requires a change of the scale of the adder in response to the stage at which the adder is located. That is, an IC having the same rating cannot be used for all of the adders. The present invention has been created to solve this problem, and satisfies the above operation needs by using a plurality of IC's having the same rating.

SUMMARY OF THE INVENTION

An object of the present invention is to provide a method and a device for obtaining a sum of products by which the summing of products on an arbitrary scale can be carried out, without the limitation imposed by the capacity of an IC, by using a plurality of IC's each having a limited capacity and a certain rating.

Another object of the present invention is to provide a method and a device for obtaining a sum of products wherein each multiplier can calculate a product by dividing the multiplicand and/or multiplier of a operand by a predetermined figure length, and thus the required number of multipliers can be accommodated in one IC.

In one aspect of the present invention, to accomplish the above-mentioned objects, there is provided a method for obtaining a sum of products wherein, when products between a pair of operands to be multiplied are calculated for a plurality of pairs and the sum for the plurality of products is calculated, the sum of products is obtained by using a predetermined multiplier means and adders to sum the products, the method including steps of, dividing at least a portion of the operands to be multiplied into a plurality of divisions having a predetermined figure length, obtaining a sum of products from each pair of operands having the same figure position as a group, and adding, by another adder, the obtained sums of products group by group by shifting the figure position of the sums corresponding to the figure position of the operands in the group.

In another aspect of the present invention, there is provided a device for obtaining a sum of products, insert including a plurality of integrated circuits each including a plurality of multiplier means, an adder group for adding products calculated by the multiplier means, and an adder having an external input, for adding the sum from the adder group to a calculation result from the preceding stage integrated circuit, wirings by which at least a portion of a multiplicand and a multiplier to be operated is divided by a predetermined number of figures, wherein the divided figures are supplied to the multiplier means, and the products of the multiplicand and the multiplier having the same figure position are added, and by which the results of the sum of products in each integrated circuit are supplied to the external input of the next stage integrated circuit with a figure shift in response to the figure position of the multiplicand and the multiplier without lower figures.

Other features and advantages of the invention will be apparent from the following description in connection with the accompanying drawings.

BRIEF DESCRIPTION OF THE DRAWINGS

FIG. 4 is a diagram showing how FIG. 4A and FIG. 4B are detailed wiring diagrams of the embodiment shown in FIG. 3;

DETAILED DESCRIPTION OF THE PREFERRED EMBODIMENTS

Prior to the description of the preferred embodiments, an example of an operation of this invention, and a conventional example thereof, are explained.

The present invention comprises a method and a device whereby, for example, the following operation is carried out. Note, this explanation is made by using concrete numerical decimal values, i.e. the following equation (1).

$$83 \times 8 + 72 \times 9 + 65 \times 3 + 29 \times 2 + 99 \times 8 + \\ 78 \times 5 + 63 \times 7 + 57 \times 4 + 33 \times 9 \quad (1)$$

First, the products of the highest figures of the multiplicands and multipliers are calculated, as follows.

$$8 \times 8 + 7 \times 9 + 6 \times 3 + 2 \times 2 + 9 \times 8 + 7 \times 5 + \\ 6 \times 7 + 5 \times 4 + 3 \times 9 = 345 \text{ (first sum of products)}$$

Then, the products of the lower figures of the multiplicands and multipliers are calculated, as follows.

$$3 \times 8 + 2 \times 9 + 5 \times 3 + 9 \times 2 + 9 \times 8 + 8 \times 5 + \\ 3 \times 7 + 7 \times 4 + 3 \times 9 = 263 \text{ (second sum of products)}$$

The lowest figure, i.e. 3, is left as it is, as a lowest figure of the obtained result, and the first sum of products, 345, is added to the highest figures, 26, of the second sum of products, to obtain a total of 371. The lowest figure, i.e. 3, is then appended to the sum of the first sum of products and the highest figures of the second sum of products, to obtain a total of 3713 as a final result.

When the first sum of products is added to the second sum of products, the two numerical values are always 3 figures and 2 figures. Therefore, as long as the adder has the capacity to handle these figures, the adder will not overflow. In the present invention, the above-mentioned operating method is applied to the general operation for obtaining a sum of products. In the above example, although the multiplier comprises only one figure, if the multiplier comprises two figures, the multiplier can be divided in the same way as the multiplicand. In a practical device, binary numbers are used, and therefore, the operation is more complex than that of the above example. However, the calculation principle is the same.

Figure 1:
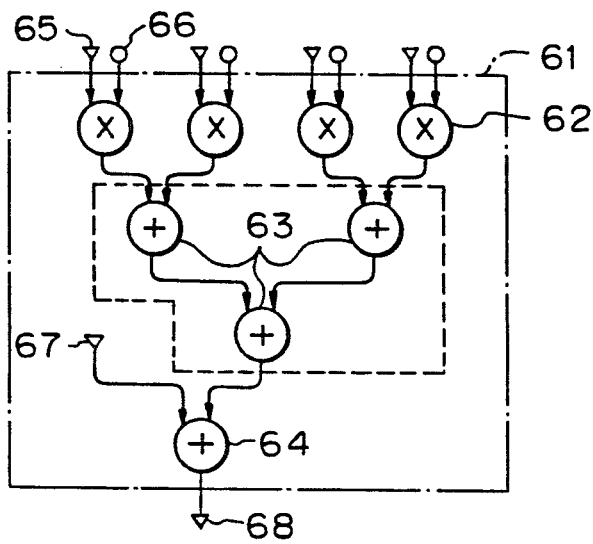
FIG. 1 is a circuit diagram of a conventional device for obtaining a sum of products.

When the operation for obtaining a sum of products is carried out, hitherto, the integrated circuit 61 shown in FIG. 1 has been used. In FIG. 1, the IC 61 comprises four multipliers 62, three adders 63, and an adder 64. Each adder 63 adds the results of the multiplied products, i.e., the products calculated by the multipliers 62. Adder 64 adds the result of the adders 63 to a result from an external input. A pair of operands, i.e., a multiplicand and multiplier, are supplied to input terminals 65 and 66. The external input of the adder 64 is supplied to an external input terminal 67, and the operating result from another IC is also supplied to the terminal 67. The result of the sum of products is output from an output terminal 68.

Figure 2:
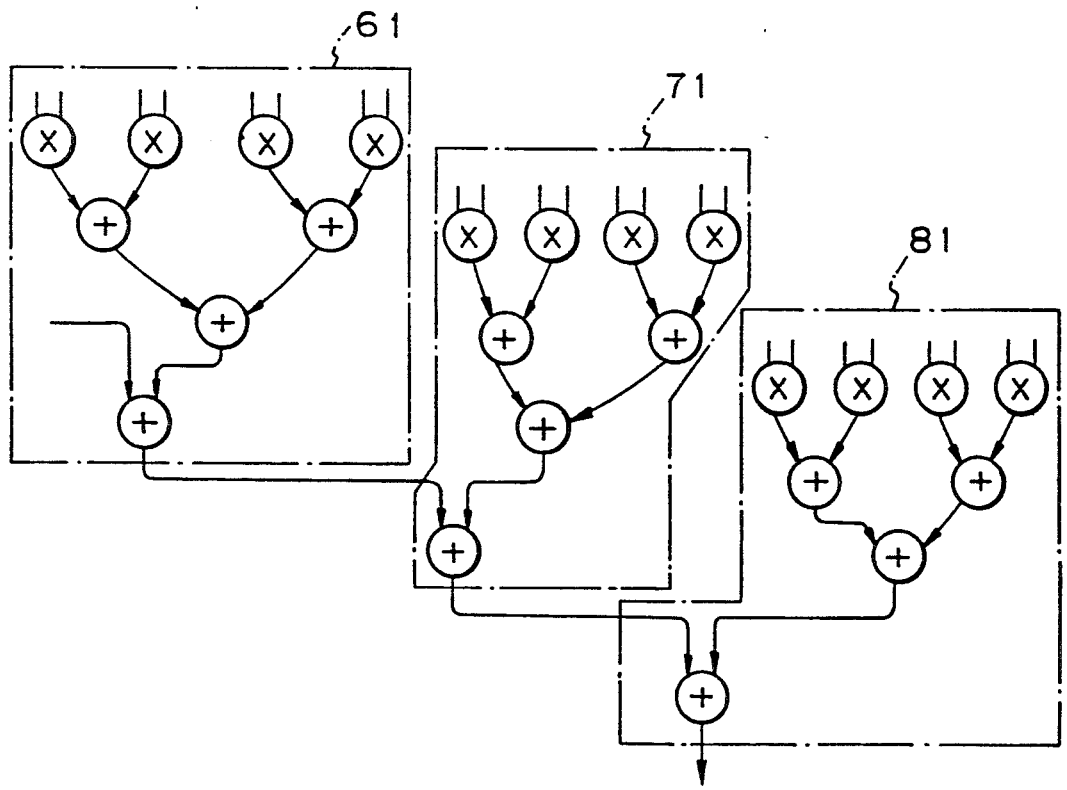
FIG. 2 is a circuit diagram showing a combination of a plurality of the devices shown in FIG. 1.

When the IC 61 performs a spatial filtering using a 3×3 matrix in a picture (or image) processing system, the sum of nine products must be obtained. Therefore, three IC's 61, 71, and 81 are connected as shown in FIG. 2. In this example, the multiplicand corresponds to the value of the picture element and the multiplier corresponds to the factor. Also in this example, if the pairs of multiplicand and multiplier are increased, then another IC must be added.

As mentioned above, in the conventional method, when the amount of data to be processed is increased, the result obtained from another IC must be supplied to the adder 64 through the terminal 67. The result obtained in that IC is then added to the result obtained from another IC, by setting the lowest figures thereof at the same position and using the adder 64. When the number of IC's is increased by one, the number of figures needed at the adder 64 becomes larger. Therefore, a problem arises in that the number of IC's must be limited to prevent an overflow of the obtained values at the adder 64. For example, assuming that the figure length of the multiplier 62 is 8 bits×8 bits and the figure length of the adder 64 is 20 bits, then there must be an overflow because of the connection of four, or more than four, IC's 61.

Further, another problem arises in that the figure length at the multiplier 62 is also limited, e.g., no more than 8 bits. Thus, an amount of data over this limit cannot be processed. Accordingly, because the scale of an IC is limited, one IC cannot include the necessary number of multipliers having a required figure length to operate the operand needed to obtain a sum of products corresponding to the amount of data.

Figure 3:
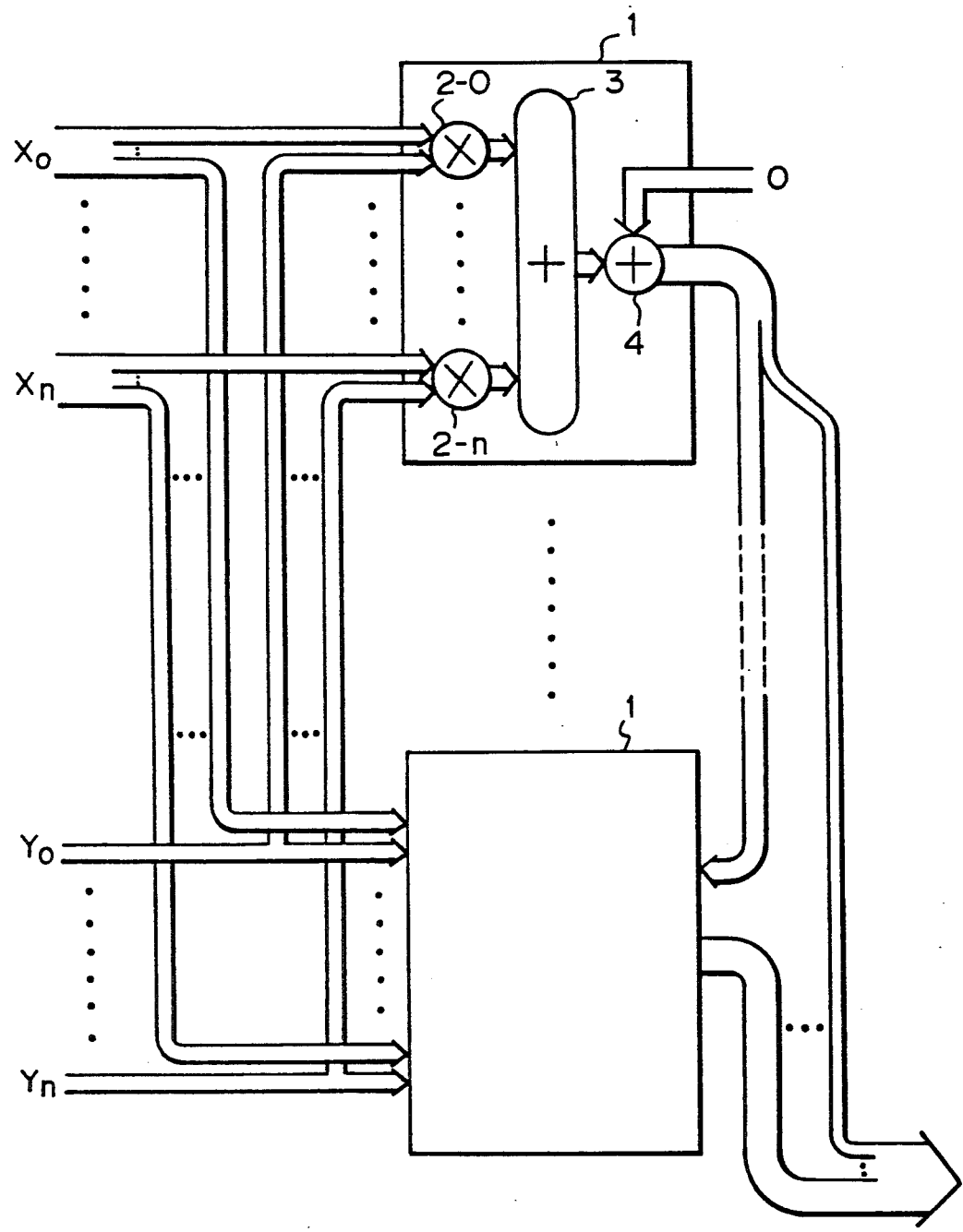
FIG. 3 is an outline diagram of wiring between IC's according to a first preferred embodiment of the present invention.

FIG. 3 shows an outline diagram of the wiring of a device according to a first embodiment of the present invention.

Figure 6:
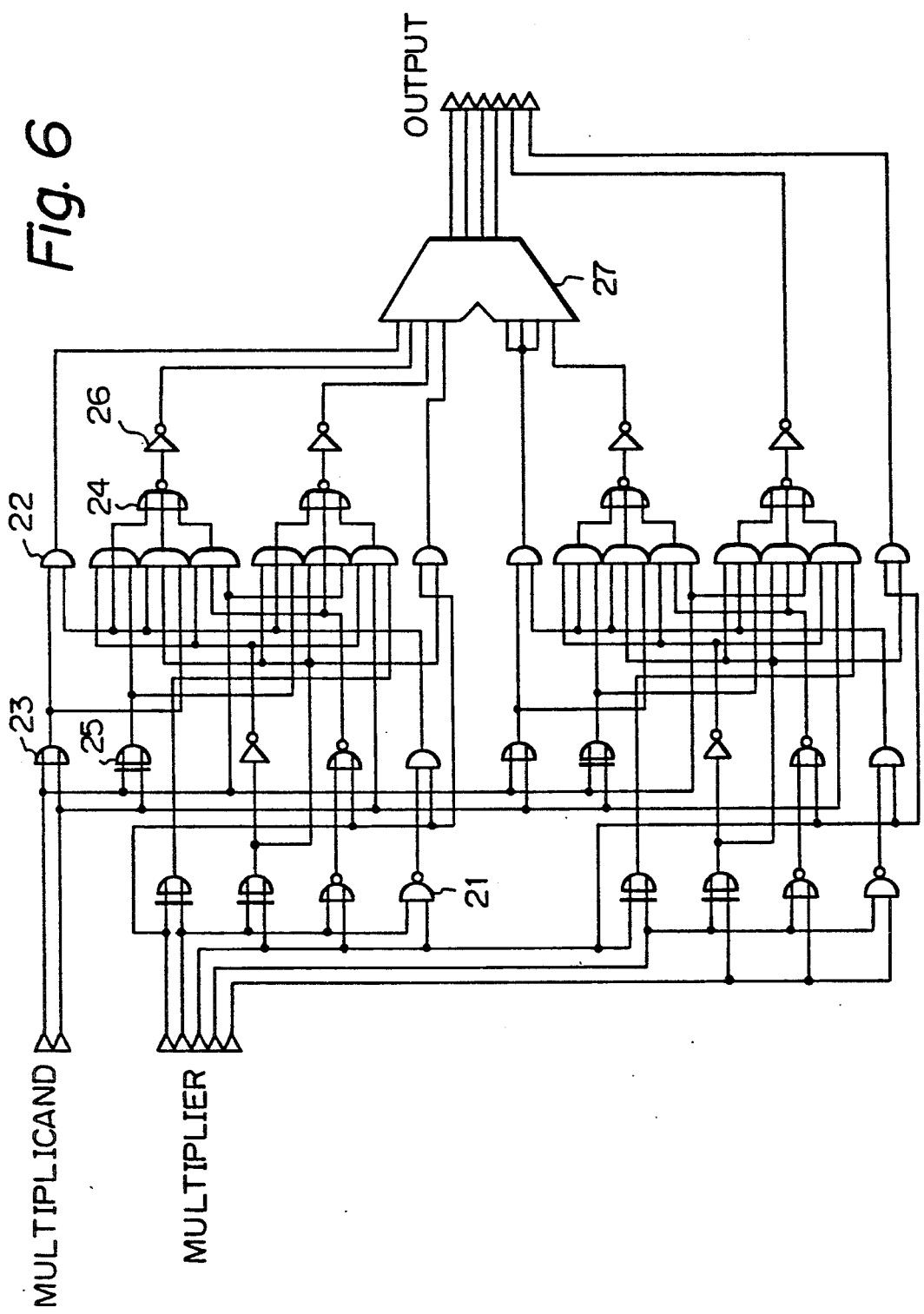
FIG. 6 is a circuit diagram of an example of a multiplier in the IC shown in FIG. 3.

An IC 1 includes a plurality of multipliers 2-0 to 2-n, an adder group 3 adding the products obtained by the multipliers, and an adder 4 adding the addition result of the adder group 3 to a result obtained from another IC. In FIG. 3, $X_0$ to $X_n$ are multiplicands. In the case of a spatial filtering using a 3×3 matrix, the number of multiplicands is nine. Each of the multiplicands $X_0$ to $X_n$, for example, includes 8 bits. The 8 bits are divided into four lots of 2 bits, and each lot of 2 bits is connected to a different IC. Thus, four IC's are used. Note, (n+1) multipliers are necessary for each IC. The multipliers $Y_0$ to $Y_n$ are, for example, 4 bits, respectively. The multiplier calculates the product using the extended Booth algorithm, and therefore, an input of 5 bits is supplied to each multiplier as shown in FIG. 6. As mentioned above, the operand includes both the multiplicand and multiplier.

The following explanations show that, in this embodiment, the sum of products is obtained with reference to equations.

Assuming that the multiplier Y is 4 bits, the multiplicand X is a positive number, and Y is a number indicated by a complement of 2, X is indicated as follows:

$$X = \Sigma x_i 2^{**i},$$

where $x_i$ is 0 or 1 and denotes the ith bit of X, and i is 0 at the lowest bit, and $2^{i}$ indicates that i is an exponent of 2, i.e. $2^{i}$ indicates the ith power of 2.

Accordingly, the product X√Y is shown as follows.

$$X \cdot Y = \left( \sum_{i=0} x_i \cdot 2^{**i} \right) \cdot Y$$

$$= \sum_{j=0} ((x_{2j+1} \cdot 2 + x_{2j}) \cdot Y) \cdot 4^{**j}$$

In this equation, the multiplicand X is divided by 2 bits, the products of each 2 bits and the multiplier Y are calculated, and each product is added by shifting two bits by two bits corresponding to the figure position before division. The above calculations are as follows.

$$\Sigma X_k Y_k = \sum_k \left( \sum_j ((x_{k,2j+1} \cdot 2 + x_{k,2j}) \cdot Y_k \right) \cdot 4^{**j}$$

$$= \sum_j \left( \sum_k ((x_{k,2j+1} \cdot 2 + x_{k,2j}) \cdot Y_k) \right) \cdot 4^{**j}$$

This equation shows that the following two operations (first and second operations) can obtain the same result. In the first operation, the multiplicands $\{X_k\}$(non-division) are multiplied by the multipliers $\{Y_k\}$ and the products $\{X \cdot Y_k\}$ are added. In the second operation, the multiplicands $\{X_k\}$ are divided by two bits, the divided two bits at the same figure position are collected, the products $\{(x_{k,i+1} \cdot 2 + x_{k,i}) \cdot Y_k\}$ of the collected bits and the multiplier $\{Y_k\}$ are obtained, the products are added with respect to the same figure position, and the added products are further added.

According to the above, X is divided by 2 bits which can be operated in the multiplier, and pairs of the divided multiplicand $x_{i+1} x_i (i=0, 2, 4, ...)$ and the multiplier Y are formed. Similarly, other multiplicands are divided by 2 bits and pairs are formed. Then, pairs having the same figure position are collected and formed into groups. In each group, the multipliers calculate the products. In the extended Booth algorithm, the multiplier Y is divided by 3 bits, the multiplicands are multiplied by 0, ±1, or ±2 in response to the value (0 to 7) of the divided 3 bits, and the results are added together by shifting 2 bits by 2 bits. Therefore, although the multiplier is negative and indicated as a complement of 2, the multiplicand X can be multiplied independently by 0, ±1, or ±2. That is, in this multiplier, the multiplier Y can be divided. The division of Y is explained later with reference to FIGS. 4A and 4B.

The products obtained at the multiplier 2-0 to 2-8 in the IC 1 are added together by the adder group 3, two by two.

The result of the sum of products obtained at each IC 1 is added to the result obtained from another IC allotted to another group by the adder 4. Then the addition result is output through the output terminal as a final sum of products. At that time, in the adder 4, the result obtained from the other IC 1 is added by shifting certain figures in response to the figure position of the group belonging to the IC. Thus, since the addition is carried out by figure shifting, the lower figures are shortened in the adding operation. Therefore, even an adder having limited figures will not overflow during the processing of the operand. That is, the limitation of the figure length does not limit the figure length of the operand at the adder.

As shown in FIG. 3, in step 1 of the invention, a plurality of pairs having operands to be multiplied are divided into a plurality of divided pairs by dividing the operand in each pair to a predetermined figure length corresponding to the capacity of an IC.

In step 2, the divided pairs having the same figure position are collected to form a group. In each group the IC obtains a sum of products from the operand.

In step 3, the sum of products obtained in step 2 is added by another adder shifting the figure of the results corresponding to the figure position of each group.

Thus, the adding operation by the adder can be shortened for the lower figures shifted by moving the figure position. The figure length at the adder is less than a predetermined length, and therefore, if a plurality of IC's are connected together, the adder will not overflow. In addition, since the multiplier can calculate a multiplicand and multiplier having a small figure length, the number of multipliers and adders in one IC can be increased.

Figure 4B:
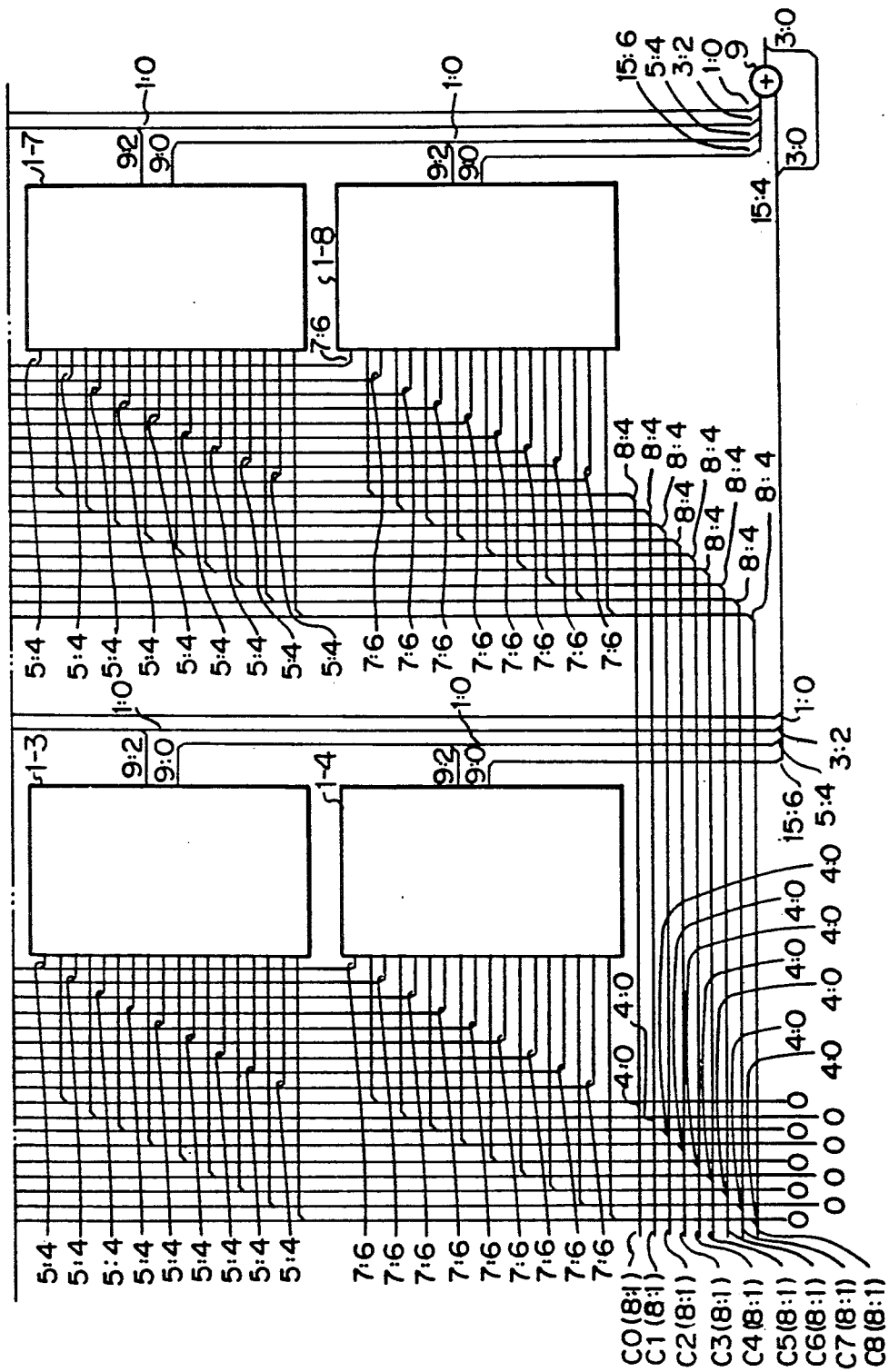

The first embodiment is now explained in detail with reference to FIGS. 4A and 4B. In this case, the multiplier Y is divided by two. Data inputs D0 to D8 correspond to the multiplicands $X_0$ to $X_n$, and factors C0 to C8 correspond to the multiplier $Y_0$ to $Y_n$. The device in this embodiment comprises eight IC's which are denoted 1-1 to 1-8. Nine multipliers (2 bits × 4 bits) are provided in each IC.

Each 8 bits of data of D0 to D8 is divided into lots of 2 bits and the divided lots of 2 bits are connected to the IC's 1-1 to 1-4, respectively. The factors C0 to C8 (8 bits) are divided into two portions. In IC 1-1, the multipliers are denoted 2-0 to 2-8. In IC 1-1, the lower (1 : 0) (8 bits are denoted from the lower figure to the higher figure as 0 to 7 and, for example, the bits from 0 to 1 denoted as 1 : 0) of the 8 bits of D0 is supplied to one input of the multiplier 2-0 and (4 : 0) of C0 supplied to the other input of the multiplier 2-0. In IC 1-1, (1 : 0) of D1 is supplied to one input of the multiplier 2-1 and (4 : 0) of C1 is supplied to the other input of the multiplier 2-1. In IC 1-2, (3 : 2) of D0 is supplied to one input of the multiplier 2-0 and (4 : 0) of C0 is supplied to the other input of the multiplier 2-0. In IC 1-5, (1 : 0) of D0 is supplied to one input of the multiplier 2-0, and (8 : 4) of C0 is supplied to the other input of the multiplier 2-0. The remaining IC's similarly, as shown in FIGS. 4A and 4B, and therefore the descriptions thereof are abbreviated. In each multiplier, the factors to be multiplied comprise 5 bits for using an extended Booth algorithm.

9 : 2 of the output (9 : 0) of the preceding stage IC is supplied to one input of the adder 4. The rest (1 : 0) is supplied to the adder 9. The adder 9 is provided out of IC 1-1 to IC 1-8. The outputs of the adders 4 of IC 1-4 and IC 1-8 are supplied to the adder 9. That is, (1 : 0) of IC 1-1 output, (1 : 0) of IC 1-2 output, (1 : 0) of IC 1-3 output, (9 : 0) of IC 1-4 output, (1 : 0) of IC 1-5 output, (1 : 0) of IC 1-6 output, (1 : 0) of IC 1-7 output, and (9 : 0) of IC 1-8 output are supplied to the adder 9. The figure positions of the above input of the adder 9 are shown in FIG. 4B. Input (3 : 0) of the adder 4 bypasses the adder 9, and (3 : 0) is appended under the lowest figure of the addition result. The external input terminals of the adder 4 of IC 1-1 and IC 1-5 are not supplied with an input signal.

Figure 5:
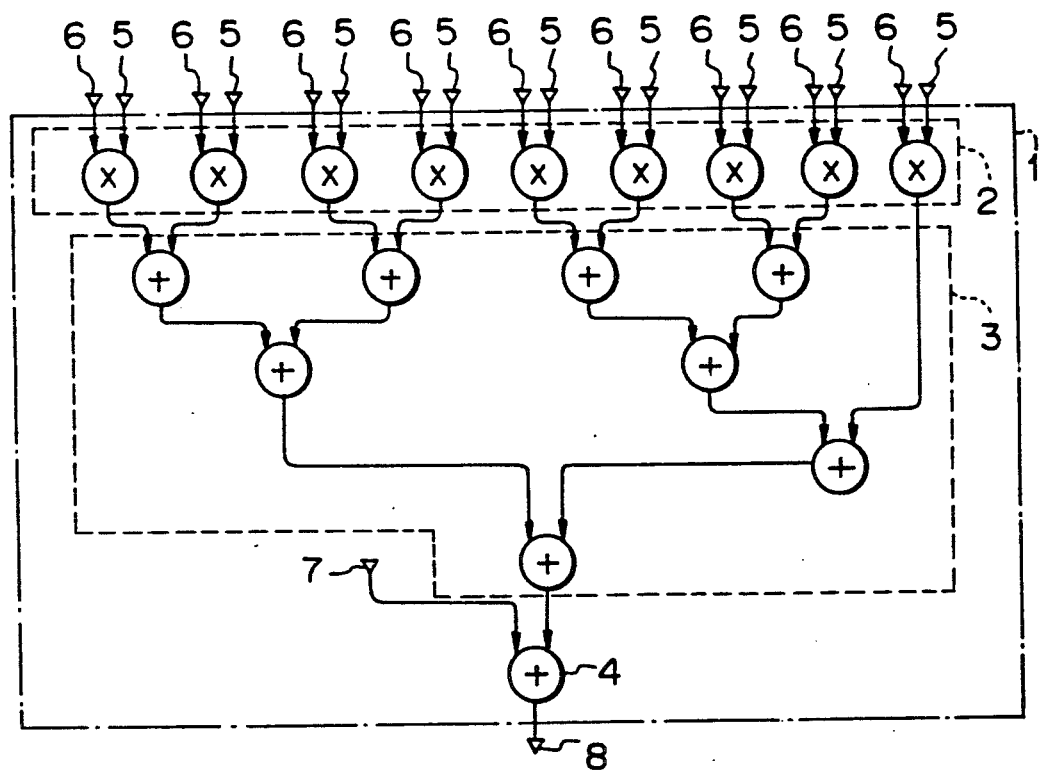
FIG. 5 is a circuit diagram of the IC shown in FIG. 3.

A detail of the above-mentioned IC 1 is shown in FIG. 5. A multiplier group 2 comprises nine multipliers 2-0 to 2-8. An adder group 3 comprises eight adders.

The adder 4 is provided with a terminal 7 for receiving an output from another IC and the output terminal thereof is referred to as numeral 8.

As mentioned above, each multiplier calculates the divided multiplicand and the divided multiplier and obtains a product. The adders add the nine products from the multipliers, and add the inputs while shifting the figure thereof in response to the figure positions of the multiplicand and multiplier. The multipliers 2-0 to 2-8 have, for example, a figure length of 2×4 bits. The adder 4 has, for example, the figure length of 12 bits. The reference numerals 5 and 6 denote input terminals for the divided multiplicand and the divided multiplier.

FIG. 6 shows a circuit diagram of an example of the multiplier. The multiplier calculates using the extended Booth algorithm. Reference numeral 21 denotes NAND circuit, 22 an AND circuit, 23 an OR circuit, 24 a NOR circuit, 25 an XOR (exclusive OR) circuit, 26 a NOT circuit, and 27 an adder of four bits.

Figure 7:
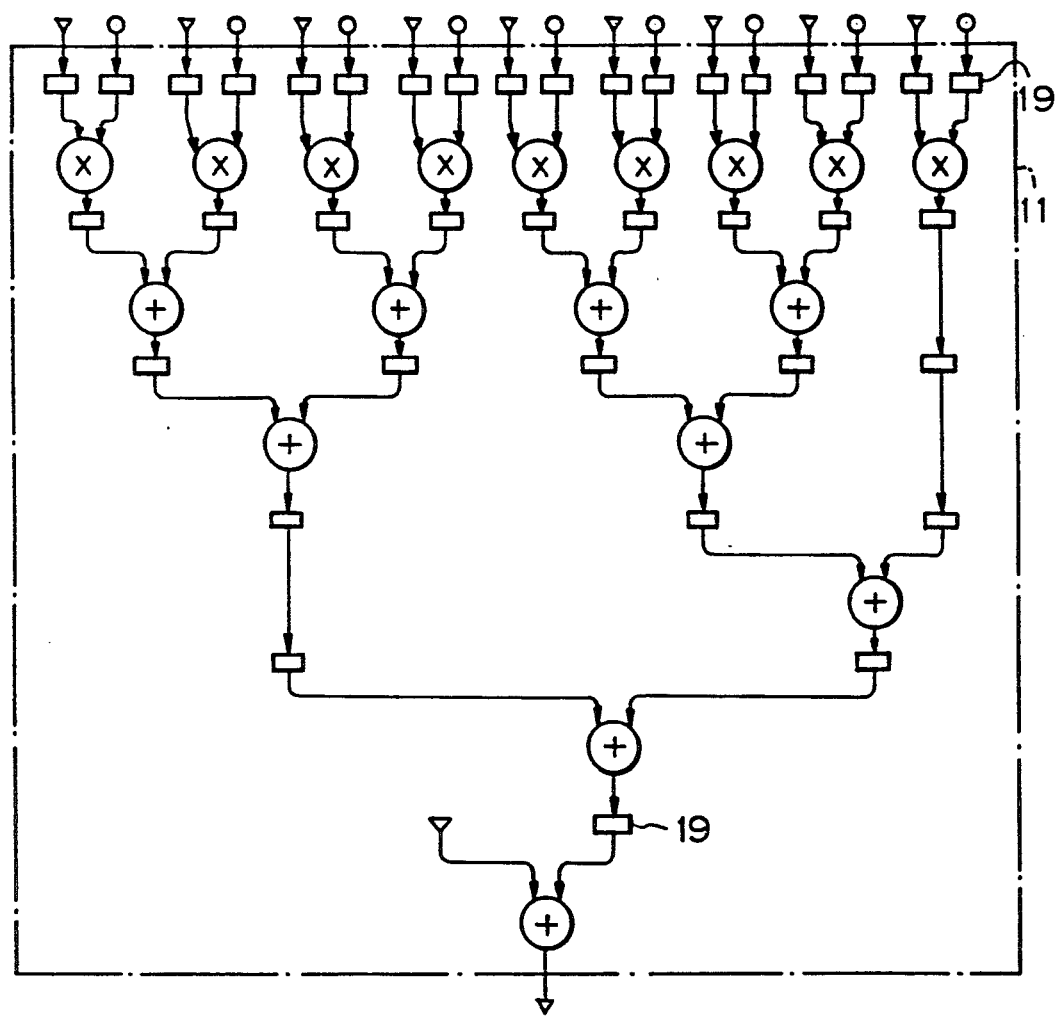
FIG. 7 is a circuit diagram of an IC according to a second embodiment of the present invention.

FIG. 7 shows a circuit diagram of an IC used in a second embodiment of the present invention.

This IC 11 comprises flip-flop circuits 19 at preceding and succeeding stages of the multipliers and adders, different from the IC of the first embodiment. By the provision of the flip-flop circuits 19, a pipeline operation in the operation of sum of products is possible.

In the pipeline operation, the processing flow of commands is divided into a maximum m steps and a maximum m commands are processed in parallel to realize high speed processing.

Namely, in the first embodiment, the input of the multiplier must be held from input application until the obtained result is output from the final adder. However, in the second embodiment, since whenever one operation is carried out the obtained result is held, the holding of the input is not necessary after the obtained result is stored in the flip-flop. Therefore, operation efficiency is increased.

Figure 8:
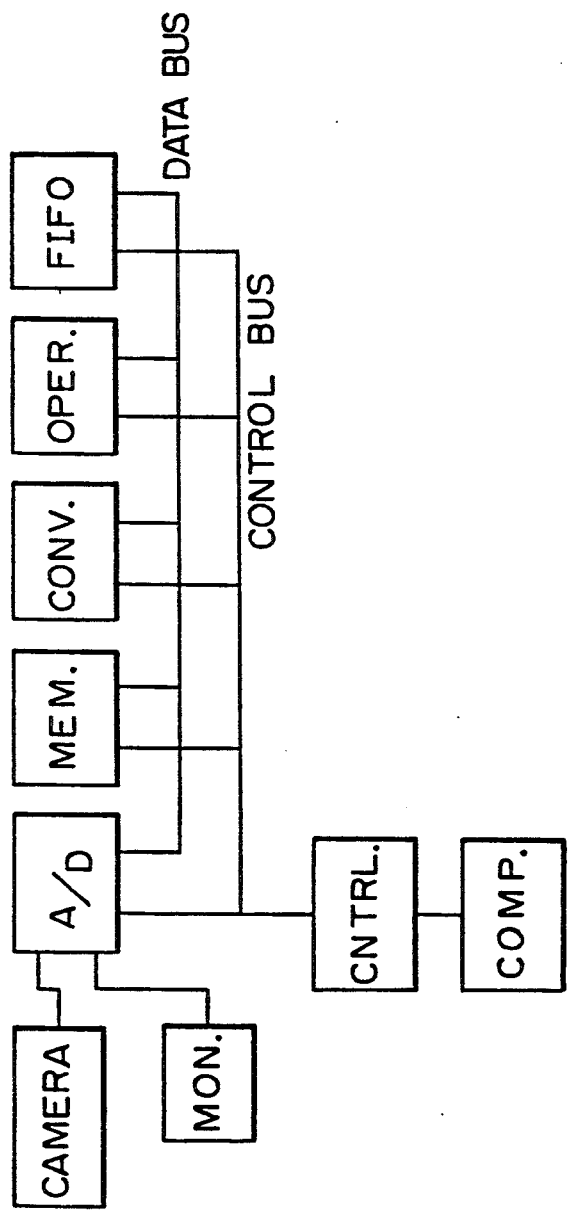
FIG. 8 is a block diagram of a picture processing system to which the present invention is applied.
Figure 9:
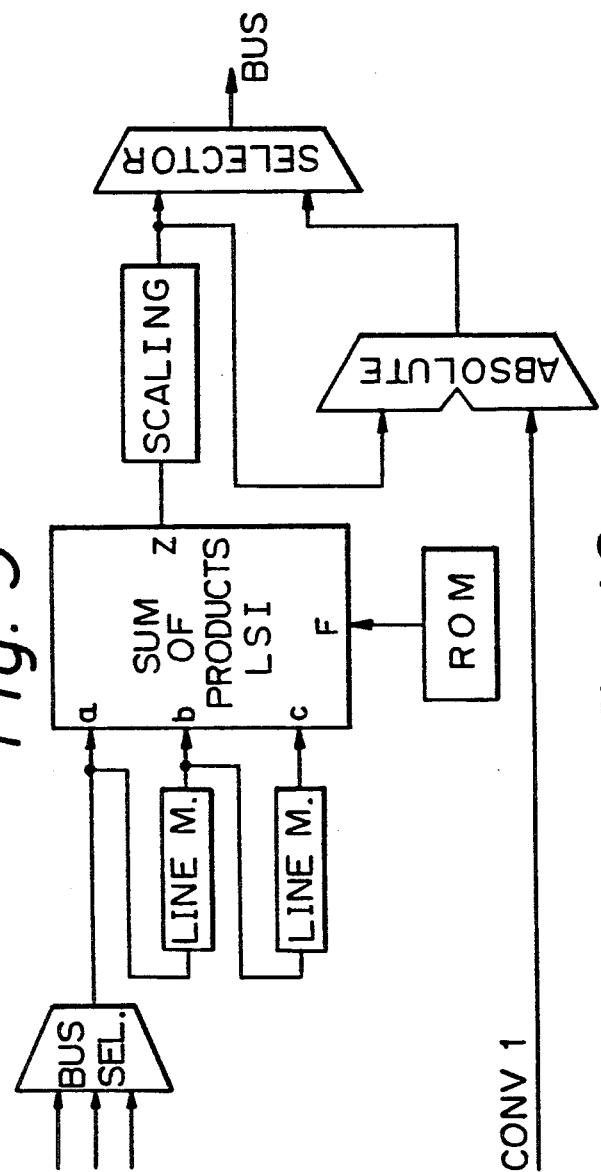
FIG. 9. is a block diagram of a portion carrying out a spatial filtering process in the system shown in FIG. 8.
Figure 10:
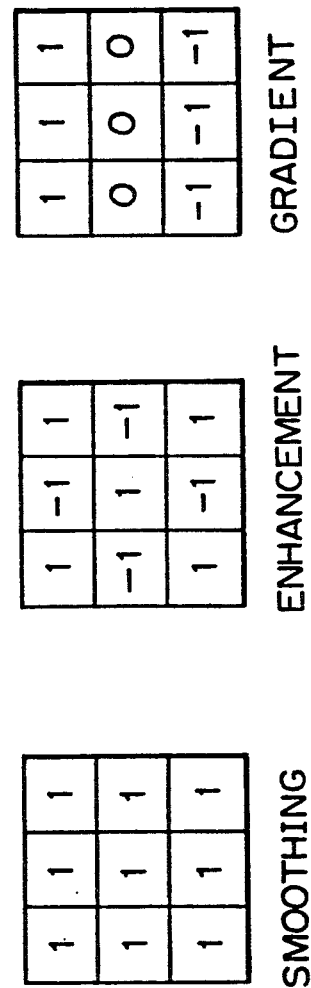
FIG. 10 is a diagram explaining factors in the obtaining of a sum of products in the portion of the system shown in FIG. 9.

A picture (image) processing system to which the present invention is applied is explained below with reference to FIGS. 8 to 10. FIG. 8 shows a block circuit diagram of the picture processing system.

A picture signal picked up through a camera is converted from analog to digital by an A/D converter, processed as a digital signal, and displayed on a monitor (MON.). The A/D converter is connected to a memory (MEM.), a convolution filter (CONV.), an operation apparatus (OPER.), and a first-in-first-out type memory (FIFO) through a data bus and control bus. The memory stores the picture signal. The picture signal is processed by a spatial filtering process through the convolution filter, and the apparatus obtains the picture signal. The FIFO stores the obtained results. The above elements or apparatus are controlled by a control board (CNTRL.) through the control bus. The control board is connected to a control computer (COMP).

Below, the convolution filter is explained with reference to FIG. 9.

At first, a desired bus is selected by a bus selection device (BUS SEL.), the picture signal sent through the bus is supplied to a large scale intergrated circuit (LSI), having a function of processing a sum of products obtained, directly or through a line memory (LINE M.) or line memories. Namely, the selected picture signal is directly supplied to an input "a", supplied to an input "b" through one line memory, and supplied to an input "c" through two line memories. In the LSI (sum of products calculating circuit), the digital picture signal value applied to the inputs "a", "b", and "c" is multiplied by factors ("F" input) stored in a ROM (read only memory) as shown in FIG. 10. The nine blocks in FIG. 10 denote that a digital value of a picture element is multiplied by the factor located at a center position. Digital values located adjacent to the picture element are multiplied by the factors located at the corresponding positions. Finally, the nine products are added and the added value becomes the new data for the picture element. All of the picture element data is replaced by the new data. Thus, the picture is made smooth, enhanced, or contour-enhanced by selection of the factor. The factors shown in FIG. 10 are three examples only.

A picture signal from CONV 1 (convolution filter 1) has been processed by a differential process, etc. The CONV 1 signal is added to the above-mentioned data (output "Z") processed by the LSI as an absolute addition. This processing is applied as a Sobel filter. The scaling device is a selector for obtaining the desired sum of products output.

Figure 11:
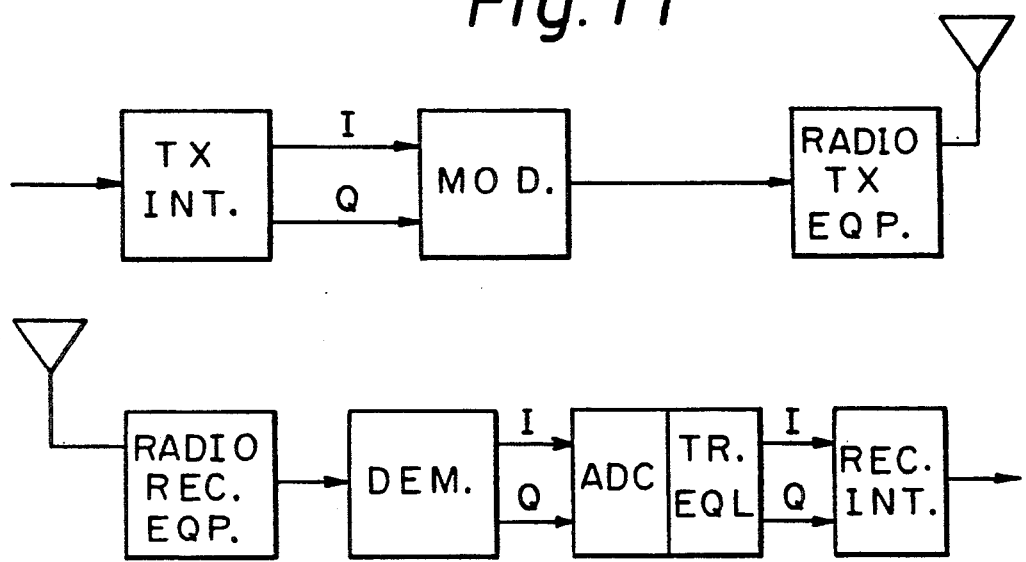
FIG. 11 is a block circuit diagram of radio communication equipment to which the present invention is applied.
Figure 12:
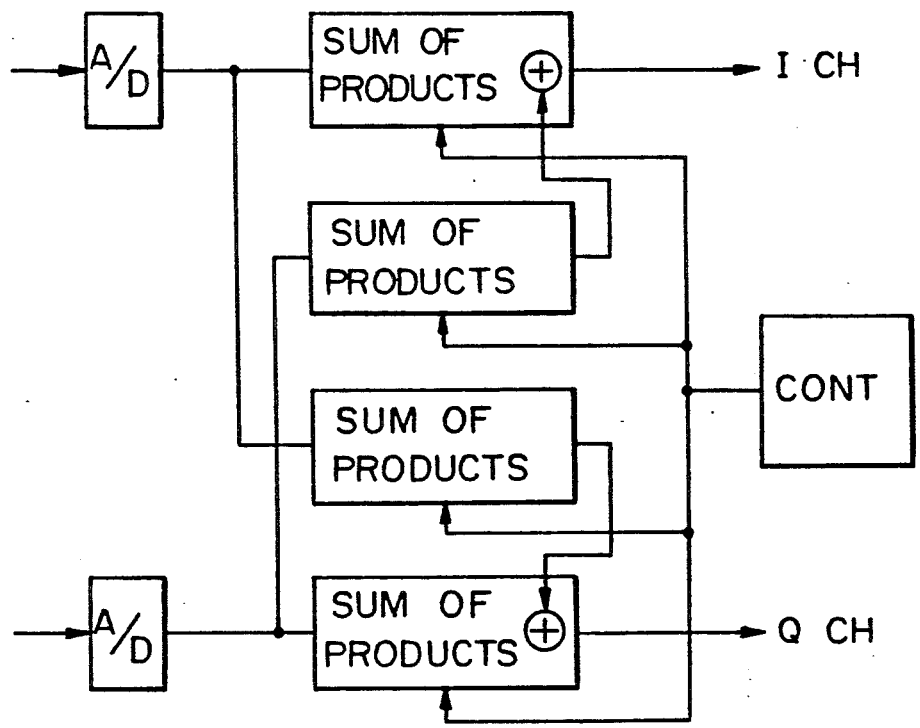
FIG. 12 is a block circuit diagram of a transversal equalizer in the equipment shown in FIG. 11.

FIG. 11 and FIG. 12 show a digital type transversal equalizer in a QAM (quadrature amplitude modulation) radio communication equipment to which the invention is applied. A transmission portion is shown in the upper portion of FIG. 11. First, a transmission interface (TX INT) separates the transmission signal into an I channel digital signal and a Q channel digital signal. The two digital signals are D/A converted and quadrature amplitude modulated by a modulator (MOD.) and the modulated signal is output through radio transmission equipment (RADIO TX EQP.) and an antenna.

The receiving side of the equipment is shown in the lower portion of FIG. 11. The signal received from an antenna is supplied to a demodulator (DEM.) through radio reception equipment (RADIO REC. EQP.). The signal is demodulated and supplied to an A/D converter (ADC). The output signal of the A/D converter is supplied to a transversal equalizer (TR. EQL). The transversal equalizer outputs an I channel digital signal and a Q channel digital signal. These signals are sent to a reception interface (REC. INT.).

The details of the A/D converter and the transversal equalizer are shown in FIG. 12. The I and Q channel analog signals from the demodulator are supplied to four sum of products processing circuits through the A/D converters. After processing as shown in FIG. 12, the I channel digital signal and Q channel digital signal are obtained. The data signals at some moments from the A/D converter corresponds to multiplicands and the tap coefficients from a control portion (CONT) correspond to the multipliers.

What is claimed is:

1. A method of processing picture signals in a picture signal processing apparatus including multipliers and adders, said method comprising the steps of:
    receiving a plurality of picture element signal groups, each picture element signal group including a number of signals;
    receiving a plurality of factor signal groups;
    multiplying, in a group of the multipliers, selected picture element signals from each group of picture element signals, and selected factor signals from each group of factor signals so as to generate sets of multiplied picture element signals;
    adding, in a first group of adders, the multiplied picture element signals within each set so as to generate a first set of partially processed picture element signals;

adding, in a second group of adders, selected partially processed picture element signals to each set of partially processed picture element signals to generate a set of output signals;

adding, in a third group of adders, said output signals to form a processed picture element signal; and outputting a plurality of processed picture element signals.

2. A method as set forth in claim 1, wherein said adding said output signals includes the step of directly adding selected ones of said output signals to said processed picture element signals.

3. A method as set forth in claim 1, wherein the step of multiplying includes the substep of multiplying, in the group of multipliers, in accordance with an extended Booth algorithm.

4. A device for processing picture signals, comprising:

means for receiving picture signal groups, each picture signal group including a number of signals;

means for receiving a plurality of factor signal groups;

a group of multipliers connected to multiply selected picture signals from each group of picture signals, and selected factor signals from each group of factor signals so as to generate sets of multiplied picture element signals;

a first group of adders connected to add the multiplied picture signals within each set so as to generate a first set of partially processed picture signals;

a second group of adders connected to add selected partially processed picture signals to each set of partially processed picture element signals to generate a set of output signals;

a third group of adders connected to add said output signals to form a processed picture signal; and means for providing a plurality of processed picture signals.

5. A device as set forth in claim 4, wherein said third group of adders includes means for directly adding selected ones of said output signals to said processed picture signals.

6. A device as set forth in claim 4, wherein said group of multipliers comprises a plurality of Booth algorithm multipliers.

7. A method of processing radio signals for a digital type transverse equalizer including multipliers and adders, said method comprising the steps of:

receiving a transmission signal;

separating the transmission signal into groups of I channel digital signals and groups of Q channel digital signals;

multiplying, in a group of the multipliers, selected I channel digital signals from each group of I channel digital signals and selected Q channel digital signals from each group of Q channel digital signals so as to generate sets of multiplied radio signals;

adding, in a first group of adders, the multiplied radio signals within each set so as to generate a first set of partially processed radio signals;

adding, in a second group of adders, selected partially processed radio signals to each set of partially processed radio signals to generate a set of output signals;

adding, in a third group of adders, said output signals to form a processed radio signal; and outputting a plurality of processed radio signals.

8. A method as set forth in claim 7, wherein said adding said output signals includes the step of directly adding selected ones of said output signals to said processed radio signals.

9. A device for processing radio signals for a digital transverse equalizer, comprising:

means for receiving groups of I channel signals and groups of Q channel signals;

a group of multipliers connected to selected I channel signals from each group of I channel signals by selected Q channel signals from each group of Q channel signals so as to generate sets of multiplied radio signals;

a first group of adders connected to add the multiplied radio signals within each set so as to generate a first set of partially processed radio signals;

a second group of adders connected to add selected partially processed radio signals to each set of partially processed radio signals to generate a set of output signals;

a third group of adders connected to add said output signals to form a processed radio signal; and means for providing a plurality of processed radio signals.

10. A device as set forth in claim 9, wherein said third group of adders includes means for directly adding selected ones of said output signals to said processed radio signals.

11. A device as set forth in claim 9, wherein said group of multipliers comprises a plurality of Booth algorithm multipliers.

* * * * *

UNITED STATES PATENT AND TRADEMARK OFFICE
CERTIFICATE OF CORRECTION

PATENT NO. : 5,138,574

DATED : AUGUST 11, 1992

INVENTOR(S) : TAKASHI AOKI ET AL.

It is certified that error appears in the above-identified patent and that said Letters Patent is hereby corrected as shown below:

TITLE PAGE [54] after "OBTAINING" insert --A--.

TITLE PAGE, Col. 2, OTHER PUBLICATIONS, after line 6, insert the following:

--PROCEEDINGS OF THE 7TH SYMPOSIUM ON COMPUTER ARITHMETIC, Urbana, Illinois, 4th-6th June 1985, pages 38-43, IEEE, S.P. Smith et al., "Design of a Fast Inner Product Processor". Page 39, column 2, line 24 - page 40, column 1, line 26; Figure 3.

WESON TECHNICAL PAPERS, 30th October/2nd November 1984, pages 1-4, Anaheim, California, LA, US; F. Toth, "High Performance CMOS DSP Building Blocks Allows Low Power System Optimization". Page 2, col. 1, line 1 - page 4, column 1, line 2; Figure 9.

PROCEEDINGS IEEE INTERNATIONAL CONFERENCE ON COMPUTER DESIGN, 1984, pages 417-422, IEEE; D.A. Henlin et al., "A 25 MHz 16 BIT x 16 BIT Pieplined Multipler". Page 417, column 2, line 1 - page 418, column 1, line 6; Table 1.

RADIO FERNSEHEN ELEKTRONIK, Vol. 33, No. 11, November 1984, pages 726-728, Ost-Berlin, DD; P. Meister, "Multiplikatormodul fur K 1520". Page 726, column 1, line 1 - page 728, column 1, line 60.

UNITED STATES PATENT AND TRADEMARK OFFICE
CERTIFICATE OF CORRECTION

PATENT NO. : 5,138,574

DATED : AUGUST 11, 1992

INVENTOR(S) : TAKASHI AOKI ET AL.

It is certified that error appears in the above-identified patent and that said Letters Patent is hereby corrected as shown below:

MINI-MICRO CONFERENCE RECORD, May 1984, pages 1-10, Northeast NY, US; N. Lodhi et al., "System Solutions for High-Speed Processor Using Innovative ICs", Page 7, column 2, line 35 - page 8, column 2, line 17; Figure 14.--.

Col. 1, line 23, "A result," should be --As a result,--;
line 25, "applied" should be --used--.

Col. 2, line 1, "a oper-" should be --an oper- --;
line 19, "products group by group" should be --products, group by group,--;
line 24, "insert" should be deleted.

Col. 5, line 1, "X √ Y" should be --X · Y--;
line 28, "{X·$Y_k$}" should be --{$X_k$·$Y_k$}--.

Col. 6, line 46, "IC's similarly," should be --IC's follow similarly,--.

Signed and Sealed this

Thirty-first Day of August, 1993

Attest:

BRUCE LEHMAN

Attesting Officer

Commissioner of Patents and Trademarks